United States Patent Office 3,187,653
Patented June 8, 1965

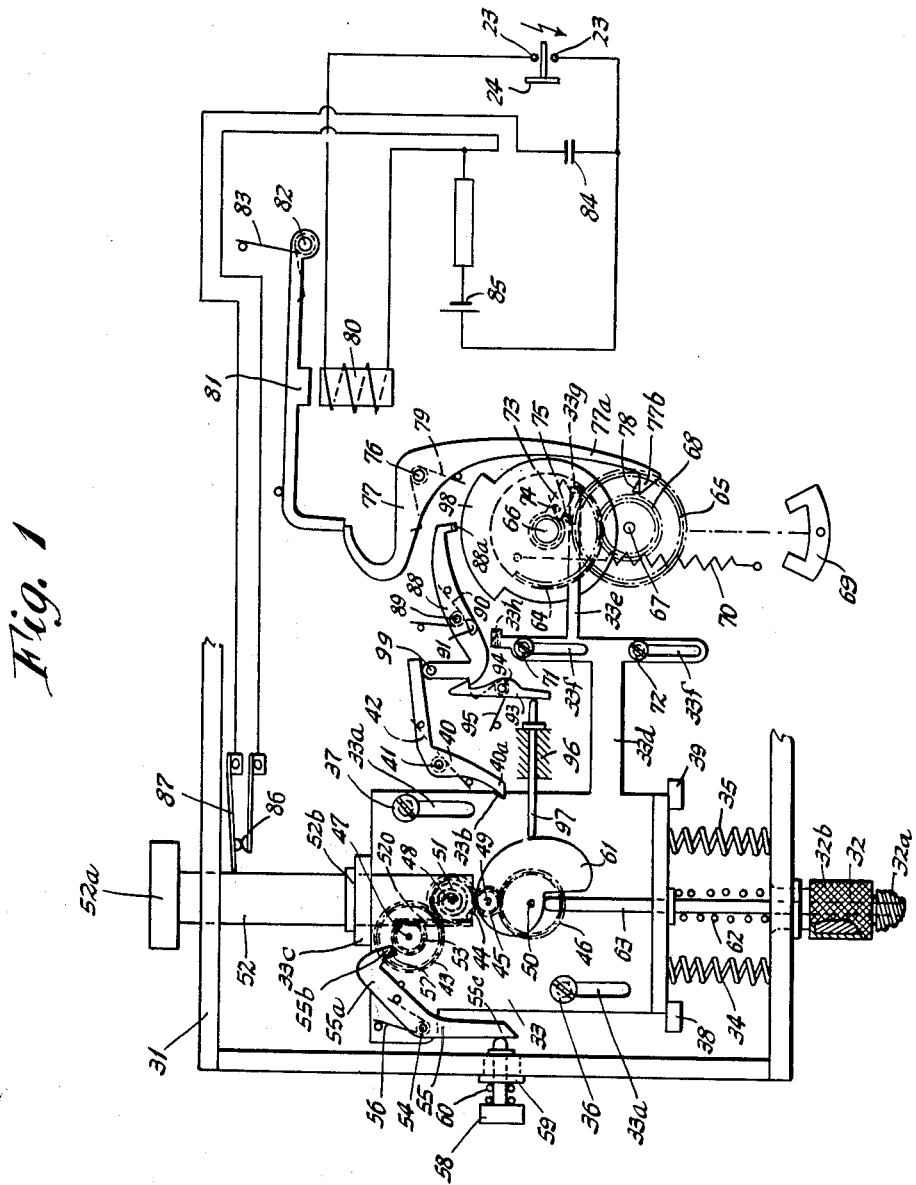

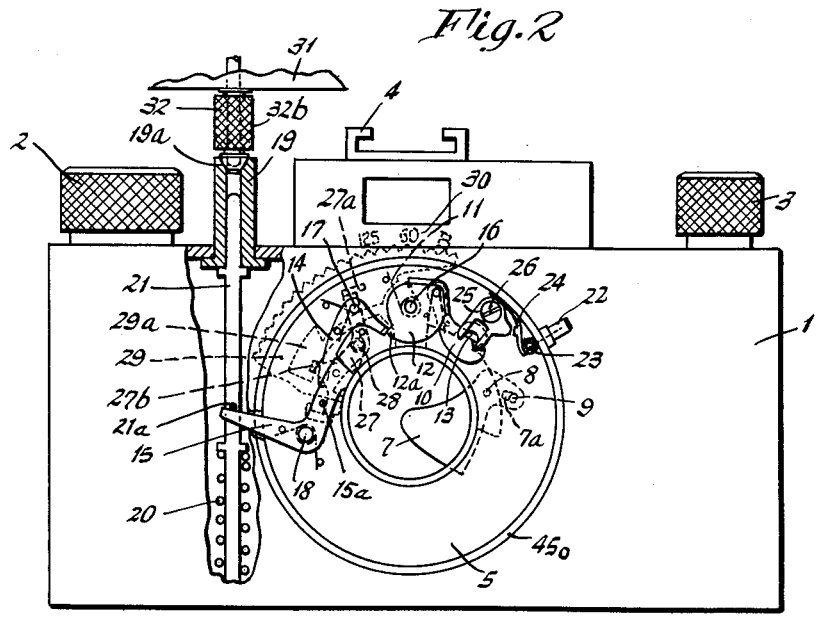
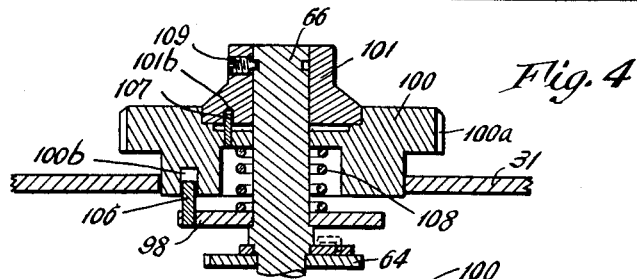
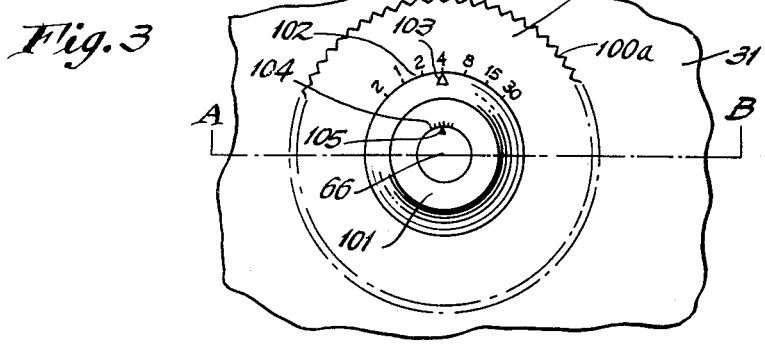

3,187,653
APPARATUS FOR REGULATING THE EXPOSURE TIME IN PHOTOGRAPHIC CAMERAS
Waldemar T. Rentschler, Calmbach (Enz), Germany, assignor to Alfred Gauthier, G.m.b.H., Calmbach (Enz), Germany, a corporation of Germany
Filed July 30, 1962, Ser. No. 213,359
Claims priority, application Germany, July 31, 1961, G 32,835
6 Claims. (Cl. 95—53)

This invention relates to apparatus for regulating the exposure time in photographic cameras and more particularly photographic cameras which contain a wire release member, a flash bulb contact device in synchronous arrangement with the running down of the shutter and means for carrying out B-exposures.

Heretofore, many cameras have been provided in which the exposure time setting range is limited to those exposure times which are suitable for taking photographs by manual operation which are not effected by the movement of the camera. Other cameras have been provided having an exposure time setting range within the limit of approximately one second. However, in actually taking photographs, it is oftentimes desirable to obtain an automatic running down exposure time of longer duration.

It is therefore an object of the present invention to provide apparatus for a photographic camera to regulate the exposure time by means of which it is possible to obtain longer automatically running down exposure times in addition to accomplishing instantaneous photographs.

It is a further object of the present invention to provide apparatus for accomplishing automatic running down of exposure times of longer duration which apparatus may be utilized in conjunction with any type of camera which is provided with a wire release connecting device, a flash bulb contact synchronized with the running down of the shutter and means for obtaining B-exposures.

Still a further object of the present invention is to provide an apparatus for obtaining automatically running down of exposure times of longer duration in cameras of the aforesaid type which apparatus comprises relatively simple structure, is easy to operate and is dependable and positive in operation.

These objects are attained by the present invention in which apparatus is provided for obtaining automatically controlled exposure times of longer duration. This apparatus is usable in conjunction with the component parts of the aforementioned type camera and its shutter arrangement without any necessity for any change thereof. A simple, completely dependable operation is accomplished by means which comprise substantially only a release mechanism and a settable time mechanism. The structure provided necessitates the use of only a limited space and the entire apparatus is of very compact form. This is especially important in that the apparatus of the present invention may usually be provided in the form of an auxiliary accessory carried apart from the camera itself.

Further, the apparatus provided by the present invention has no effect on the B-exposure device, the flash contact device or any other devices utilized by the basic camera. As a result the apparatus may be used in conjunction with every camera of the type described hereinabove. There is no necessity for making any complex preparations before using the apparatus of the present invention for it is easily connectable to and releasable from the wire release connection and to the flash bulb contact device of the basic camera.

Another advantage obtained by the present invention is that the assembly and adjustment of the apparatus may be effected completely independently of the camera itself. It is only necessary to set the desired exposure time and to consider the camera constants influencing the exposure time prior to the use of the attachment. Such constants are, for example, the moment of the contact closing of the flash bulb synchronization device which depending on the type of synchronization used is situated either before or during the opening time of the shutter (M-synchronization and F-synchronization) or during the time when the shutter is completely open (X-synchronization).

Still another advantage of the arrangement of the structure provided in the apparatus of the present invention resides in the fact that the electromagnet, which is utilized to release the time mechanism, may be located in the discharge circuit of a battery-capacitor circuit. Therefore, the current supplied to the electromagnet is of constant voltage independent of the charging state of the battery. This arrangement assures a completely dependable operation of the electromagnet as well as the entire apparatus.

In accordance with the present invention, capacity loss of the battery is prevented when the apparatus is inoperative due to the presence of a circuit breaker arrangement in the charging circuit of the capacitor. In addition, the means provided by the present invention to obtain different exposure times are easily and simply adjustable and clearly visible indicating the different exposure times which are being used.

Other advantages and features of the present invention are set forth in greater detail in the accompanying specification which describes one embodiment of the present invention as also disclosed in the accompanying drawing in which:

FIG. 1 is a front elevational view partly in section of the apparatus for regulating the exposure time connected with the flash bulb contact of the camera. The apparatus is in cocked position.

FIG. 2 is an elevational view partly in section of a photographic camera provided with an intra-lens shutter showing the flash bulb contact controlled by the shutter, the means for carrying out B-exposures and the wire release connecting device to which the apparatus provided by the present invention may be connected. The interior of the shutter arrangement is exposed and the exposure time setting member of the shutter is indicated in broken lines and is set in the B-exposure position.

FIG. 3 is a top view of the setting mechanism of the apparatus provided by the present invention.

FIG. 4 is a sectional view taken along the lines A—B of FIG. 3.

Referring specifically to the drawings and particularly FIG. 2 thereof, there is illustrated a type of camera which may be utilized in conjunction with the apparatus for providing exposure times of longer duration. It will be understood that the specific camera shown is merely exemplary of the construction of various types of cameras which can accommodate the apparatus of the present invention hereinafter described.

In FIG. 2, the camera housing 1 is provided, in a well-known manner, with an actuating knob 2 for the transport of the film and an actuating knob 3 for the rewinding of the film. A socket 4 is provided for accommodating auxiliary accessories as, for example, flash bulb devices, distance meters or the like.

The intra-lens shutter is located on the front of the camera housing 1 and comprises a shutter housing 450 carrying a shutter base plate 5 constructed in a manner hertofore known. A shutter blade ring 6 (indicated in dotted lines) is mounted on the rear of the shutter base plate 5 and actuates the shutter blades 7 (only one of which is shown for clarification purposes). The shutter blades are provided with slots 7a and are disposed around fixed pins 8 carried by the shutter blade driving ring 6. The shutter blades 7 are movably guided about fixed pins 9 which are accommodated within the slots 7a of the shutter blades 7. A pawl 10 is pivotally connected to the driving disc 12 which is influenced for movement in a rotary direction by driving spring 11. The pawl 10 engages pin 13 fixed on the shutter blade driving ring 6 to thereby move the shutter blade driving ring upon movement of the pawl 10. An arresting lever 14 serves to maintain the driving disc 12 in cocked position until such time as the arresting lever 14 is moved by a release lever 15. Fixed shafts 16, 17 and 18 about which are disposed the driving disc 12, the arresting lever 14, and the relase lever 15, respectively, are carried by the base plate 5. A release knob or stud 19 provided with a bore or keyway is longitudinally movably arranged on the upper portion of the camera housing 1 intermediate the film transport knob 2 and the socket 4 and being shiftable at right angles to the axis of the shutter. A coil spring 20 is disposed within the camera housing abutting a collar provided on a release plunger 21 and normally urges the plunger and also the stud 19 into the position shown in FIG. 2. The release plunger 21 is vertically movable within the keyway in the stud 19 against the action of the spring 20. A pin 21a, carried by the release plunger 21, establishes an operative connection between the release plunger 21 and the release lever 15. A contact member 22 provided with an insulated pin 23 is adapted to operatively engage a contact spring 24 in order to operate flash bulb attachments in a well-known manner. The contact spring 24 is actuated by a lever 25 which is engaged by the pin 13 disposed on the shutter blade driving ring 6. The lever is positioned about axis 26 on the shutter base plate 5. At the moment of the complete release of the shutter opening, the contact spring closes the ignition circuit which is connected to the contact member 22.

In addition to the means provided for utilizing flash bulb exposures, the shutter arrangement in the camera of the type illustrated in FIG. 2 also has a device for obtaining B-exposures. The device comprises an arresting lever 27 disposed about an axis 28 on the shutter base plate 5. The arresting lever 27 is urged by a spring into engagement with a pin 15a carried by the release lever 15. The arresting lever 27 is provided with a bent-off lug 27a. When the lever 15 is released, the arresting lever 27 moves as a result of the action of the spring into the path of movement of a projecting portion 12a provided on the driving disc 12. The driving disc 12 is thereby held in that position in which the shutter blades 7 are opened. In order to close the shutter blades, the arresting lever 27 is returned to its initial position by the pin 15a of the release lever 15, as shown in FIG. 2, upon the release of the stud 19. The release of the stud 19 causes the release plunger 21 to move upwardly due to the action of spring 20. The pin 21a is disengaged from the lever 15, and the lever thereupon returns to its initial position. The actuation of the B-exposure device is accomplished in a well-known manner by means of an exposure time setting ring 29 which is shown by dotted lines in FIG. 2. The ring 29 is provided with a control groove 29a adapted to accommodate a bent-off lug 27b provided on the arresting lever 27. When the ring 29 is set at the indicia B of the exposure time scale 30, the lug 27b is accommodated in the enlarged segment of the control groove 29a. Upon actuation of the shutter release lever 15, the arresting lever 27 is thereby permitted to move outwardly into the locking position. When the exposure time setting ring 29 is set for an instantaneous exposure time, the lug 27b is accommodated within the narrower segment of the control groove 29a thereby to prevent the arresting lever 27 from moving into locking position.

Furthermore, as hereinafter described, the apparatus provided by the present invention in no way affects the construction of the B-exposure device, the flash contact device, or of any of the other means or structures utilized in and with the camera of the type hereinbefore described.

In accordance with the present invention, the apparatus comprises a housing 31, as shown in both FIGS. 1 and 2. A rotatable wire release connecting knob 32 of the well known type is provided with a threaded portion 32a and a knurled exterior 32b. As shown in FIG. 2, the apparatus is affixed to the wire release connecting threaded portion 19a of the stud 19. It wil be understood that while this specific connection has been illustrated, it is also possible to mount the apparatus provided by the present invention in the socket 4 of the camera. In this latter event, the connection will be accomplished by means of an intermediate wire release piece which would be able to be screwed onto and connect the threaded portions 32a on the apparatus and 19a on the camera.

Referring specifically to FIG. 1, the apparatus comprises a carrier plate 33 located within the housing 31 and provided with slotted portions 33a. The carrier plate is vertically movable against the influence of compression springs 34 and 35, which are connected to the base of the carrier plate and the bottom of the housing. Fixed screws 36 and 37 extend through the slots 33a and guide the carrier plate when the latter is moved in a vertical direction. This vertical movement is limited by two fixed stops 38 and 39. The carrier plate 33 is maintained in cocked position by an arresting lever 40 disposed about an axis 41 in the housing 31. The arm 40a of the arresting lever 40 normally is engaged in an opening 33b on the side of the plate 33 and this engagement is maintained by the influence of the spring 42 on the arresting lever 40.

The plate 33 has a laterally extending arm 33d having wing portions provided with slots 33f. A resilient lug 33h is disposed on the upper wing portion of the extending arm 33d. A laterally projecting arm 33e extends from the wing portion of the arm 33d and is provided at its extremity with a bent-off lug 33g for the purpose hereinafter set forth.

The carrier plate 33 carries the shutter release mechanism of the apparatus, which mechanism is constructed in a well known manner and comprises a series of meshed gears 43, 44, 45 and 46 which are disposed about axes 47, 48, 49 and 50, respectively. The shutter release mechanism also includes a spiral spring 51 which actuates the driving gear 44. A plunger 52 is accommodated as shown in the housing 31 on the plate 33 and is provided with an actuating knob 52a. The plunger 52 effects the cocking of the spring 51 by means of the connection between the serrated segment 52c of the plunger 52 and a pinion 53 affixed to the gear 43. When the plunger is depressed, the gear 43 is turned to cock the spring 51. The spring 51 is not as strong as the springs 34 and 35 acting upon the carrier plate 33. Therefore, upon the cocking motion of the plunger 52, first the release mechanism and thereafter the plate are moved into the cocked position illustrated in FIG. 1. The plunger 52 is provided with a collar 52b which engages a bushing 33c affixed to the plate. The bushing 33c provides a guideway for the plunger 52 and the foregoing arrangement enables the movement of the plunger 52 to effect and consequently move the plate 33 against the action of the springs 34 and 35.

A two-armed arresting lever 55 is disposed about axis 54 on the plate 33. A spring 56 influences the arresting lever 55 for movement in a clockwise direction thereby to retain the release mechanism in cocked position. One arm 55a of the arresting lever 55 is provided with a projecing portion 55b which is engaged by a pin 57 carried by gear 43 when the release mechanism is in cocked position. A release member 58 accommodated within the sleeve 59 provided on the side of the housing 31 is influenced outwardly of the housing by a spring 60 interposed between the head of the release member 58 and the sleeve 59. The arm 55c of the lever 55 is in operative engagement with the release member 58, as shown.

A cam 61 is affixed to the gear 46 of the release mechanism. A release tappet 63 is maintained in position engaging the circumference of the cam by means of the influence of the spring 62 disposed between the base of the housing 31 of the apparatus and the bottom of the plate 33. The release tappet is vertically movable against the action of the spring 62, as hereinafter described. One end of the release tappet 63 is accommodated within the plate 33 and the other end rides in a sleeve provided in the wire-release connecting member 32 to engage the release plunger 21 of the camera itself as illustrated in FIG. 2.

When the shutter release mechanism is in its cocked position, the release tappet 63 is inoperative and is disposed in the position shown in FIG. 1 in which it engages the concave surface of the cam 61. This position is maintained due to the action of spring 62 upon the tappet 63. When the release member 58 is depressed for running down of the shutter release mechanism, the cam disk 61 also begins a running down rotary motion causing the release tappet 63 to be vertically moved downwardly against the action of the spring 62. During the course of the movement, the tappet 63 engages and moves the release plunger 21 in the camera. The pin 21a on the release member 21 thereby moves the lever 15 causing the shutter to open. When the shutter reaches its fully opened position, it is retained in such position by the B-arresting lever 27 in the manner hereinbefore described. When the shutter release mechanism has run down, the release tappet 63 is engaged by the high point of the convex portion of the cam 61 thereby to hold the release device of the camera shutter in its depressed position which corresponds to the operative position of the B-arresting lever 27.

In order to obtain automatically controlled exposure times of longer duration, the period of time during which the shutter is retained in open position by the B-device is determined by a time mechanism. The time mechanism, which is provided with a driving device, causes the release tappet to return to its starting position after the time mechanism has accomplished a pre-set running down path of movement. This return renders the B-device inoperative.

The time mechanism of the apparatus of the present invention is located within the housing 31 and comprises, as shown in the illustrated embodiment of the invention, gears 64 and 65 disposed about shafts 66 and 67, respectively. A pinion 68 affixed to the gear 65 meshes with and operatively engages the gear 64. Further, the time mechanism comprises additional gears and pinions as well as an escapement wheel, all of which are indicated by the dot-and-dash lines in the drawing in FIG. 2 in order to simplify the disclosure. The gears and pinions and the escapement wheel are operatively engaged by an escapement U-shaped plate or anchor 69. A spring 70 is provided to activate the gear 64 for driving the time release mechanism. The spring 70 is cocked at the same time that the cocking of the carrier plate is accomplished by means of the movement of the extending arm 33d and the consequent movement of the wing portion whose slots carry pins 71 and 72 carried by the housing 31. This movement is, in turn, transmitted to the laterally projecting arm 33e which functions to cock the spring. The bent-off lug 33g of the laterally projecting arm 33e operatively engages a driving pawl 73 which is rotatably positioned about the axis 66 of the gear 64. A spring 74 acts to maintain the driving pawl in engagement with a pin 75 affixed to the gear 64.

The aforementioned time mechanism is so constructed that the cocking motion of the carrier plate 33 causes the time mechanism to be moved into cocked position by the movement transmitted through the extended arm 33d, the projecting arm 33e, the pawl 73 and the pin 75 moving gear 64. It will be understood that the return of the plate 33 to its initial or starting position has no influence on the time mechanism.

A two-armed arresting lever 77 disposed about axis 76 located in the housing 31 retains the time mechanism in the cocked position shown in FIG. 1. One arm 77a of the lever 77 is provided at its extremity with a lug 77b adapted to engage a pin 78 affixed to the gear 65 when the mechanism is in cocked position. A spring 79 maintains the lever 77 in the arresting position.

In accordance with the present invention, an electromagnet 80 actuates the arresting lever 77. The contact member 22, insulated pin 23 and contact spring 24 are arranged in the circuit of the electromagnet 80 and the electromagnet is activated when the contact device is switched on or closed. The armature of the electromagnet 80 is constructed in the form of a lever 81 disposed about an axis 82 in the housing 31. The armature lever 81 is operatively engaged by the arresting lever 77. When the electromagnet is not operating, the lever 81 is maintained in contact with the arresting lever 77 under the influence of the spring 83 acting upon the armature lever 81 and is in the position illustrated in FIG. 1. However, when the electromagnet 80 is energized by the closing of the aforementioned contact device, the lever 81 is attracted to the electromagnet 80 whereupon the arresting lever is released and against the influence of spring 79 moves to disengage the projection 77b from the pin 78 on gear 65. The time mechanism is thereby released for running down and controls an actuating device hereinafter described in detail. The actuating device releases the arresting lever 40 from its engagement with the carrier plate 33 after a pre-settable running down path of movement of the time mechanism.

The electromagnet 80 is located within the circuit leading from a capacitor 84 which is fed by a battery 85. A circuit breaker comprising contacts 86 and 87 is located in the discharge circuit from the capacitor. The contacts 86 and 87 of the circuit breaker are normally kept apart by means of the collar 52b provided on the plunger 52, which engages the contact 87 when the plunger 52 is in position extending outwardly from the housing of the apparatus. When the plunger is depressed, the contact 87 is released and engages contact 86 to establish a closed circuit.

The actuating device hereinbefore mentioned which releases the arresting lever 40 from its engagement with the carrier plate 33 comprises, in the illustrative embodiment of the invention, a lever 88 disposed about an axis 89 located in the housing 31. The lever 88 is influenced for movement in a clockwise direction by spring 90. The lever 88 is provided with a bent-off arm 88a and can be moved concurrently with the plate 33 into the cocked position illustrated in FIG. 1. The means for cocking the lever 88 comprise the resilient lug 33h disposed on the upper wing portion of the extending arm 33d. The resilient lug 33h is adapted to operatively engage a pin 91 which is affixed to the lever 88 and which is provided with a beveled surface. Another lever 93, positioned about an axis 94 in the housing 31, maintains the lever 88 in cocked position under the influence of spring 95. The cam 61 actuates the arresting lever 93 during the running down of the release mechanism. The operative engagement between the cam 61 and the lever 93 is accomplished by means of a rod 97 one end of which engages the cam 61 while the other end engages the lever 93. The rod 97 is displaceably movable in a fixed guide 96. When the actuating lever 88 becomes disengaged from the arresting lever 93, the lever 88 moves to a limited degree in a clockwise direction whereupon the bent-off arm 88a engages a cam 98 which is operatively connected to the time mechanism. This limited movement does not affect or influence the arresting lever 40 which continues to retain the carrier plate 33 in cocked position.

Upon the running down of the time mechanism, the cam 98 moves in a counterclockwise direction and ulti-

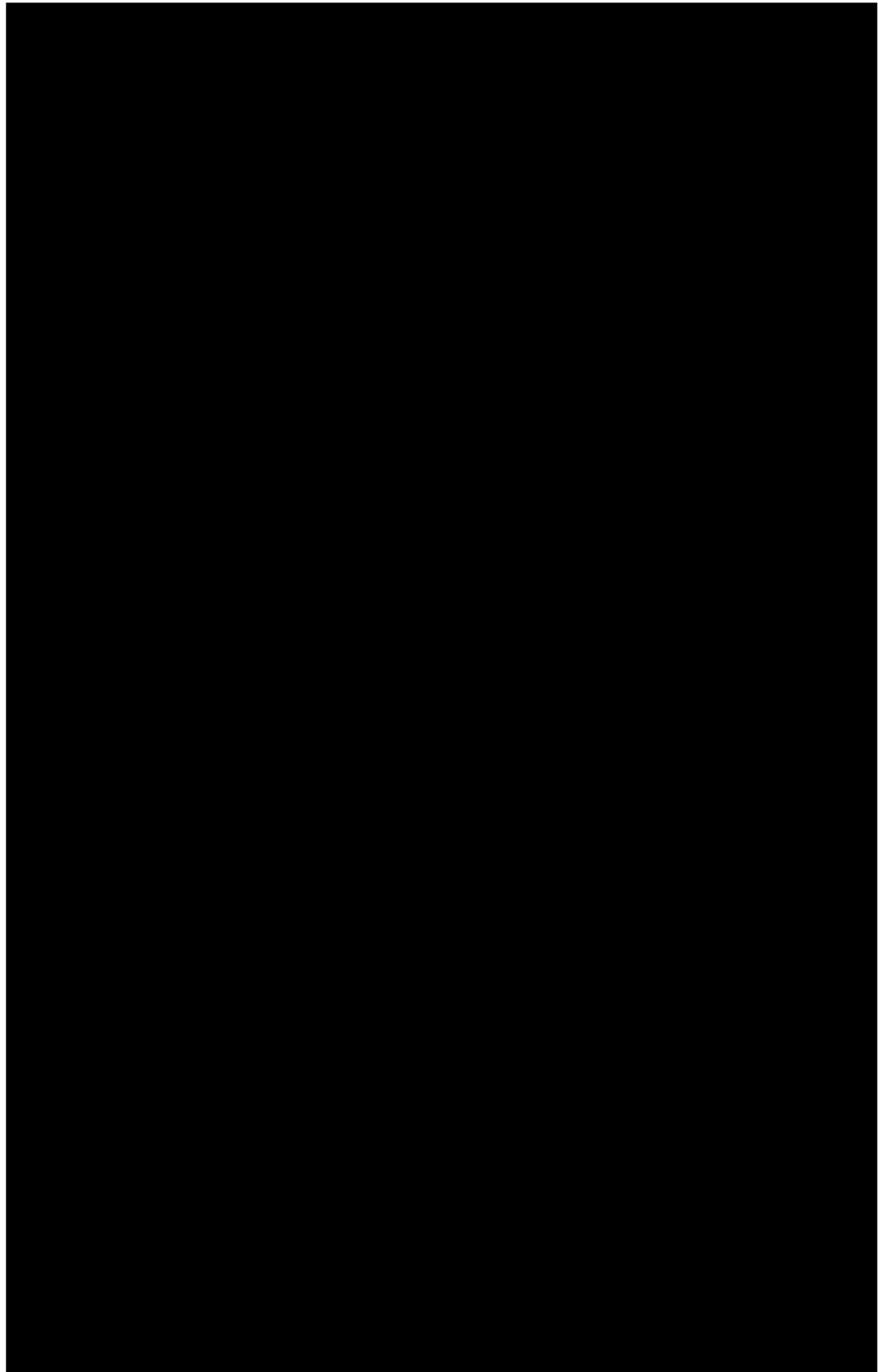

(f) a timing mechanism operatively associated with said release mechanism,
(g) a time arresting means for maintaining said timing mechanism in its cocked position,
(h) an electric circuit for effecting the actuation of said time arresting means,
(i) said circuit including an electromagnetic means for actuating said time arresting means when energized, said electromagnetic means being energized by the actuation of said switch,
(j) a capacitor connected in said circuit with said electromagnetic means so that said capacitor is charged when said release mechanism is cocked;
(k) and an actuating device controlled by said time mechanism to effect release of the locking means retaining said shutter releasing means after a presettable running down of said time mechanism.

5. In combination with a camera having shutter means including a shutter blade driving ring, a plurality of shutter blades operatively connected to said driving ring for movement between open and closed positions, a shutter drive means operatively connected to said driving ring, an arresting lever for maintaining said shutter drive means in the cocked position thereof, camera release arranged to operate on said arresting lever to effect release of said shutter means when actuated, means including a contact switch adapted to operate a flash bulb attachment, and means operatively associated with said shutter means for controlling the shutter exposure time in the B setting range of said camera, the improvement of a detachably connected accessory attachment for controlling the exposure time of said shutter means, said attachment comprising:
(a) a release mechanism for releasing the shutter of the connected camera,
(b) an actuating means drivingly connected to said release mechanism,
(c) a shutter releasing means operatively associated between said actuating means and said shutter for effecting release of said shutter in the B-setting thereof upon the running down of said actuating means,
(d) a locking means to retain said shutter release means in its released position,
(e) a timing mechanism operatively associated with said release mechanism,
(f) a time arresting means for maintaining said timing mechanism in its cocked position,
(g) means for effecting release of said time arresting means,
(h) said latter means including a battery and capacitor circuit,
(i) a switch connected in series with said circuit and actuated by the cocking of said release mechanism to permit the capacitor to be charged from the battery when said release mechanism is cocked,
(j) an electromagnetic means for effecting release of said time arresting means when energized by actuation of said contact switch,
(k) and an actuating device controlled by said timing mechanism and cooperating with said actuating means to release said locking means retaining said shutter releasing means after a presettable running down time of said timing mechanism.

6. In combination with a camera having shutter means including a shutter blade driving ring, a plurality of shutter blades operatively connected to said driving ring for movement between open and closed positions, a shutter drive means operatively connected to said driving ring, an arresting lever for maintaining said shutter drive means in the cocked position thereof, a camera release arranged to operate on said arresting lever to effect release of said shutter means when actuated, means including a contact switch adapted to operate a flash bulb attachment, and means operatively associated with said shutter means for controlling the shutter exposure time in the B setting range of said camera, the improvement of a detachably connected acessory attachment for controlling the exposure time of said shutter means, said attachment comprising:
(a) a housing,
(b) a spring biased carrier plate movably mounted in said housing,
(c) a shutter release mechanism carried on said plate,
(d) means for effecting the cocking of said shutter release mechanism by effecting movement of said carrier plate,
(e) a first arresting lever for maintaining said carrier plate in its cocked position of said plate,
(f) a second arresting lever for maintaining said release mechanism in its cocked position,
(g) a release operating on said second arresting lever to effect a running down motion of said shutter release mechanism,
(h) a cam means operatively connected to said shutter release mechanism to run down therewith,
(i) means for connecting said attachment to the camera release, said latter means including a release tappet operatively associated with said cam means whereby the actuation of said tappet upon run down of said cam means and associated release mechanism actuates said shutter means,
(j) a timing mechanism to obtain controlled exposure times,
(k) said timing mechanism including a time driving means,
(l) and means for effecting cocking of said timing mechanism upon said movement of said carrier plate,
(m) a time arresting lever for maintaining said timing drive means in its cocked position,
(n) means for effecting release of said time arresting lever,
(o) said latter means including a battery and capacitor circuit,
(p) a switch connected in series with said circuit and actuated by the cocking of said carrier plate to permit the capacitor to be charged from the battery when said shutter driving mechanism is cocked,
(q) an electromagnetic means for effecting release of said arresting lever when energized by actuation of said contact switch,
(r) and an actuating device controlled by said timing mechanism and cooperating with said cam means to release said first arresting lever after a presettable running down time of said timing mechanism.

References Cited by the Examiner
UNITED STATES PATENTS 2,880,798   4/59   Lohmeyer. _____ 95—53 X
2,978,970   4/61   Fahlenberg. _____ 95—53.3

FOREIGN PATENTS 412,239   6/34   Great Britain.

NORTON ANSHER, Primary Examiner.

JOHN M. HORAN, Examiner.